(No Model.)
G. J. OVERSHINER.
ROAD CART.
No. 538,843. Patented May 7, 1895.
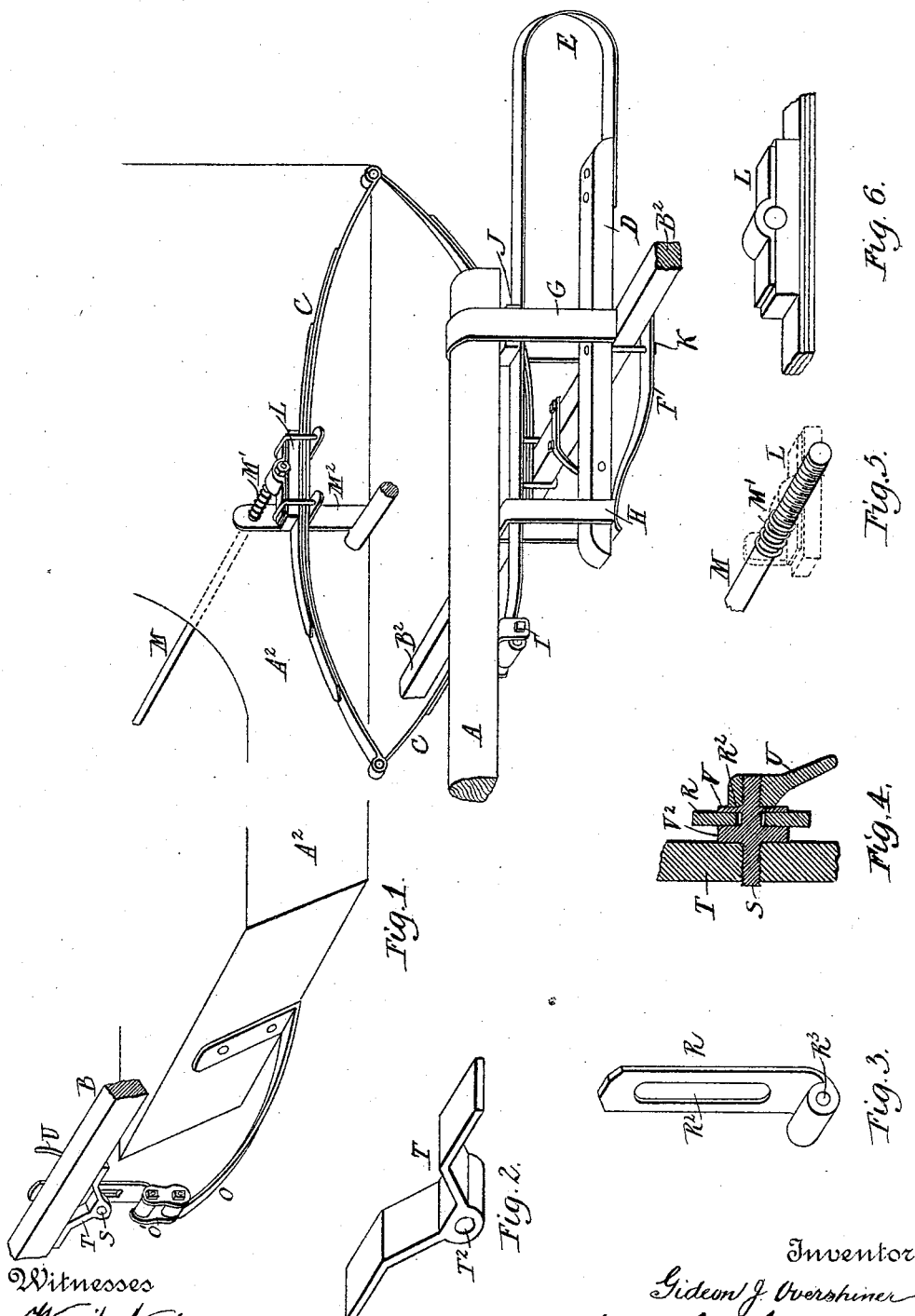
Witnesses
W. J. Norton
Bruce A. Elliott
Inventor
Gideon J. Overshiner
By W. W. Dudley
his Attorney

UNITED STATES PATENT OFFICE.

GIDEON JACKSON OVERSHINER, OF SAN DIEGO, CALIFORNIA, ASSIGNOR OF ONE-HALF TO JOHN O. W. PAINE, OF SAME PLACE.

ROAD-CART.

SPECIFICATION forming part of Letters Patent No. 538,843, dated May 7, 1895.

Application filed April 4, 1894. Serial No. 507,167. (No model.)

*To all whom it may concern:*

Be it known that I, GIDEON JACKSON OVERSHINER, a citizen of the United States, residing at San Diego, in the county of San Diego and State of California, have invented a new and useful Pleasure Road-Cart; and I hereby declare that the following is a full, clear, and exact description of my invention, such as will enable others skilled in the art to which it appertains to make and use the same.

My invention relates to improvements in pleasure road carts, and the objects of my improvements are to prevent the motion of the shafts caused by the motion of the horse, known as horse motion, being communicated to the body of the cart, and so affecting unpleasantly the occupant of the cart, to permit the body of the cart to be adjusted to a level, whether occupied by one or more persons, or whatever the weight it carries, or the size or weight of the horse driven therein, and to relieve the cart and the occupant from the unpleasant, jerky, jigly motion experienced in driving over rough roads and rough places, in any roads in the ordinary road cart, at the same time reducing the strain on the different parts of the cart, to a minimum; and at the same time to carry the weight of the body and its occupants well balanced over the axle, and relieve the horse from unnecessary weight when standing hitched up in the unoccupied cart. I attain these objects by the mechanism illustrated in the accompanying drawings.

Figure I is a perspective view of one side of the cart, showing the manner of mounting the body upon the springs, the springs connecting the shafts to the axle and the body to the shaft-bar, and other mechanism connected therewith, as constructed for use. Fig. II represents the iron plate used to connect the body to and is fastened underneath to the shaft draft-bar. Fig. III represents a steel plate with a slot in the center and closed at each end, the lower end having an eye formed by turning it up to receive the bolt uniting it with the shackle-links to connect the body of the cart with the shaft draft-bar, and by the use of which the body may be made level by raising or lowering the front of the same. Fig. IV represents a bolt having a solid collar in the center and screw-threads at both ends and a tail-nut turned onto the rear end, the front end screwed into the iron plate, and is used in connecting the slot-plate with the shaft draft-bar. Fig. V represents a section of the hanging-bar upon which the body of the cart is hung, showing the coil-spring placed upon the axle-bar between the body and the spring-block. Fig. VI represents the spring-blocks placed upon the elliptic springs to hold fast the hanging-bar.

Referring to the drawings, A is the shaft; $A^2$, the body of the cart; B, the shaft bar to which is attached the body of the cart and the single tree; $B^2$, the main axle; C, an ordinary elliptic spring; D, side bar of wood or iron; E, steel shaft spring; F, steel spring; G, stirrup band; H, stirrup band; I, thill coupling; J, rubber block; K, bolt; L, spring block; M, hanging bar; M', coil spring; $M^2$, iron T plate; O, iron body loop; O', shackle link; R, slotted steel plate; $R^2$, slot in steel plate; S, bolt; T, iron plate; U, tail nut; V, washer; $V^2$, solid iron collar.

The same letters of reference indicate corresponding parts in all the figures.

Referring to the several parts by letter, A is a shaft with an ogee bend in the rear, and extending completely back a little beyond the main axle "$B^2$," with no break or cut.

B is a shaft draft bar, to which is attached the single tree and the body of the cart at its center; $B^2$, an ordinary axle; C, an ordinary elliptic spring; D, side bar made of wood or iron, fourteen inches long, bolted solidly to the top of the main axle, and running underneath and parallel with the shaft, equal distances on each side of the axle; E, single plate steel spring, one end of which is connected to and underneath and about nine inches from the heel of the shaft by means of a thill coupling, and is so bent as to leave a space of about half an inch between it and the shaft, and running back to the rear end of the side bar is bent down in a curve over and turned to the front underneath and bolted to such side bar, and serves to connect the shaft with the axle of the cart, and aids to relieve the cart and its occupant from the jerk and jar consequent upon driving over rough roads or any obstacle, and at the same time steadying and regulating the up-and-down motion of the shaft, and aids in preventing the motion of the horse being communicated through the motion of the shafts to the body of the cart and its occupant.

F, is a single plate steel spring, which is made fast to the axle underneath by the same bolts which connect therewith the side bar and stirrup band, and extending to the front on a line with and directly underneath the side bar and shaft upon which the stirrup H, rests, which is pressed down upon when the back part of the cart body is lowered, and serving to prevent the body and side elliptic spring from tipping back too far and too suddenly, and equalizes the motion of the elliptic spring, the shaft and shaft spring.

G, is an iron stirrup band resting upon the top of the side bar, and having feet at right angles with the loop of the band, so that bolts pass down through each of the feet and through the side bar on each side of the axle, and through the spring "F" (which spring plate forms a yoke for the bolts), and is made secure to the axle by nuts on the end of said bolts. Through this band passes the heel of the shaft and the upper part of the spring "E," and it serves to prevent the heel of the shaft from rearing up too high, or swinging to the side, and to keep the shaft and spring "E" in place.

H, is an iron stirrup band, bolted to the shaft underneath, with the loop at right angles with the shaft, through which passes the top of spring "E," and the front end of the side bar, and the bottom of which being square, rests upon the spring "F," and presses down upon it, when the back part of the body is lowered, and also serving to keep the shaft and spring in line with the side bar.

I, is an ordinary thill coupling, made secure to the shaft, to which is attached the front end of the spring "E" by means of an eye in the spring through which passes a bolt connecting it with the shaft, and by such loose connection permitting the shaft motion, up and down, as moved by the horse when in motion, and forming a fulcrum, which, when the front end of the shaft is raised up, presses the heel of the same down upon the spring "E," which serves to hold it in place and steady it, while not holding it rigid, and thus preventing the motion of the horse being communicated to the cart and its occupants, or the axle of the cart being rocked back and forth, as it would be if the shaft was rigidly attached to the axle.

J, is a rubber block, placed between the shaft and the upper part of the spring "E," held in place within the stirrup G, and serves as an elastic rest for the heel of the shaft, when it presses down upon it, and through it, upon the spring "E," when the body of the cart tips forward, or the forward end of the shaft is raised.

L, is a malleable iron spring block, having a hole through it from the side, in which is cut female screw threads, to permit the end of the hanging bar to be screwed through it, and is fastened with clips to the elliptic spring. Its use is, to make fast the body of the cart suspended on the hanging bars "M" to the elliptic spring.

M, is a round, steel, hanging bar, which passes through the body of the cart from side to side, and extends out on each side, having screw threads cut in each end, upon which bar the body of the cart is hung. The spring blocks "L" are turned on to the ends of this bar, and the blocks then placed upon the springs suspend the cart body upon the bar so resting upon the elliptic springs; and the body being so hung, the rotary motion of the axle, and of the elliptic springs, forward and back, is not communicated to the body of the cart and its occupants, and it allows the body to adjust itself to the rise and fall and motion of the springs and the shafts, without communicating a sudden, jerky motion to the occupant, and also permitting the front part of the body to be raised or lowered, in adjusting it to a light or heavy weight, or a large or small horse.

M', represents coil springs, one of which is placed on the hanging bar, at each side of the cart body, between the body and the spring block, to hold the body in place, and serves also to relieve the body and its occupant from the jar caused by its being thrown suddenly to one side or the other.

M², is an iron "T" plate, fastened in an inverted position to the side of the cart body, having a hole through the upper part near the end, through which to pass the hanging bar, and one arm of which is fastened to the body underneath, the other arm extending out underneath the upper part of the elliptic spring, serving to strengthen the body to support its weight and load on the bar, and the outside arm serving to prevent the body of the cart from tipping too far back, in case the front connection should be broken.

O, is an iron body loop, secured at the rear end to the center of the front end of the body, and also underneath it, and having an eye turned up on the front end, by means of which it is attached by a bolt to shackle links, and its use is to attach the cart body to the shaft bar.

O', represents shackle links, one end of which is attached by bolt to the body loop, the other end by bolt to the steel slot plate, in making the connection between the body of the cart and the center of the shaft bar, and by its use allows a back and forward motion of the cart body, and aids in relieving it and its occupants from the jerk and jar which would be experienced to a greater or less degree if the connection was rigid.

R is a steel slotted plate with an oblong slot in the center closed at both ends and having an eye turned up on the lower end, by which to connect it with the shackle links and which being fastened on the bolt, serves to attach the body to the center of the shaft bar.

$R^2$, is a slot in slot plate, which permits it to be slipped on the bolt, and move up and down on the bolt in raising or lowering the front of the body, to allow the body to be adjusted to a proper level, whatever the weight it carries, or whether a large or small horse be driven in it.

S, is an iron bolt, having screw threads cut in both ends and a solid collar in the center, and is screwed into the plate, nearly up to the collar, but so left that it will turn back and forth easily, the threads of the plate allowing it to take a rotary motion, used to make the connection between the body of the cart and the shaft bar, and by its use allowing the ends of the shaft bar and the shafts to move up and down without communicating such motion to the cart body in the manner which would be done, if the rotary motion were not provided for.

T, is an iron plate, the center of which drops down in a "V" shape, having a hole cut through the lower part of the "V" in which are cut female screw threads, which plate is fastened to the under side and center of the shaft draft bar, the hole being at right angles with the bar, into which is screwed the bolt connecting the slot plate with the shaft bar.

U, is a tail nut, which fits on the rear end of the bolt "S." The forward end of the bolt having been screwed into the plate "T" nearly up to the shoulder, the slot plate "R" is slipped on to the rear end of the bolt, and a washer "V" slipped on after it, when the tail nut is turned on, making the slot plate fast, by pressing it against the shoulder of the bolt at any point desired, in raising or lowering the front of the cart body, and the screw of the bolt fitting loosely into the plate "T" allows the bolt to take a rotary motion, preventing strain upon the shafts, as they move up and down with the motion of the horse, or upon the body of the cart, and aiding to prevent the motion of the horse communicating to the shafts and shaft bars being communicated to the body of the cart and its occupants.

$V^2$, is a solid iron collar in the center of the bolt "S," against which is clamped the slotted plate "R."

I am aware, that prior to my invention, road carts have been made with shafts cut, spliced and manipulated in many ways, to prevent the motion of the shafts being communicated to the axle, and through it to the cart body and its occupants; but

What I claim as my invention, and desire to secure by Letters Patent, is—

1. In a pleasure road cart, the combination of a body, an axle, a continuous shaft running back and over the axle and connected thereto by means of thill couplings, springs forming a part of said connection, a hanging bar attached to the body and having springs on the outer portions thereof, a T plate on each side of said body with which the hanging bar engages, a shaft bar attached to the front of the body, a slotted plate adjustably secured to the shaft bar, a plate attached to the shaft bar, a bolt with opposite screw threaded ends respectively engaging the plate on the shaft bar and the said slotted plate, said bolt having a slotted collar, and a tail nut engaging one end of said bolt, substantially as described.

2. In a pleasure road cart, the combination of a shaft, a body, a hanging bar attached to said body and indirectly secured to the shaft, an axle, a T-plate on each side of the body engaged by said hanging bar, and coiled springs on the outer portions of said hanging bar, substantially as described.

3. In a pleasure road cart, the combination of a shaft, a body, a hanging bar connected to said body and indirectly attached to said shaft, an axle, elliptical springs, other springs attached to said shaft and the elliptical springs, T-plates on opposite sides of the body engaged by the hanging bar and movably resting on the elliptical springs, and coiled springs on the outer portions of said hanging bar, substantially as described.

4. In combination with a body of a pleasure cart, of a hanging bar, an axle, elliptical springs on which the outer ends of said hanging bar rest, and springs surrounding the outer portions of said hanging bar, substantially as described.

5. In a pleasure cart, the combination of a body and shaft, a shaft bar carrying an apertured plate, a body loop attached to the front portion of the body, a collar having a bolt, an annular recess and a clamp, a slotted plate adapted for said recess and vertically adjustable with relation to the shaft bar, and shackles at the lower end of the plate to which the body loop is secured, substantially as described.

GIDEON JACKSON OVERSHINER.

Witnesses:
C. L. CLIFF,
G. A. CASE.